(12) United States Patent
Gorun (10) Patent No.: US 7,670,684 B2
(45) Date of Patent: Mar. 2, 2010

(54) FUNCTIONAL COATING COMPOSITIONS OF PERFLUOROALKYL PERFLUORO-PHTHALOCYANINE COMPOUNDS

(75) Inventor: Sergiu M. Gorun, Montclair, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 873 days.

(21) Appl. No.: 11/349,492

(22) Filed: Feb. 7, 2006

(65) Prior Publication Data

US 2006/0234060 A1 Oct. 19, 2006

Related U.S. Application Data

(60) Provisional application No. 60/651,126, filed on Feb. 8, 2005.

(51) Int. Cl.
*B32B 27/00* (2006.01)
*B32B 27/18* (2006.01)
*B32B 9/00* (2006.01)
*B05D 3/10* (2006.01)

(52) U.S. Cl. .................. 428/421; 428/422; 427/367; 427/372.2; 430/78; 430/135; 528/402

(58) Field of Classification Search ............ 528/402; 430/58, 78, 135; 428/422; 427/367, 372.2
See application file for complete search history.

(56) References Cited

U.S. PATENT DOCUMENTS 5,238,764 A   8/1993   Molaire et al.
5,238,766 A   8/1993   Molaire et al.
6,511,971 B1  1/2003   Gorun

FOREIGN PATENT DOCUMENTS

WO        00/21965      4/2000

OTHER PUBLICATIONS

PCT International Search Report dated Mar. 20, 2008.
Leznoff, et al., Phthalocyanines: Properties and Applications (Tables of Contents only), VCH Publishers, New York, 1990-1996, vols. 1-4.
Saji, Thin Film Phthalocyanine Chemistry and Technology, pp. 167-195.
McKeown, Phthalocyaine Materials: Synthesis, Structure and Function (Table of Contents only), Cambridge University Press, Cambridge, 1998, pp. vii-x.

(Continued)

*Primary Examiner*—Duc Truong
(74) *Attorney, Agent, or Firm*—McCarter & English, LLP (57) ABSTRACT

Coating compositions comprising perfluoroalkyl metallo and non-metallo perfluoro-phthalocyanine compounds and associated coating methods are provided by the present invention. Perfluoroalkyl metallo and non-metallo perfluoro-phthalocyanine compounds are suitable for use as functional coatings and may be optionally combined with conductive polymers. The functional properties imparted generally include one or more of chemical resistance, thermal resistance, biological and chemical non-stick surface behavior, electrochromism, variable electromagnetic field signatures, and/or non-linear optical properties. Advantages of the disclosed perfluoroalkyl metallo and non-metallo perfluoro-phthalocyanine coatings include the fact that an inert uninterrupted fluorinated surface provides for improved hydrophobic properties at the periphery while exhibiting improved hydrophilicity at the center, which in turn results in one or more of the following properties: variable optical, electric and magnetic properties; enhanced durability; and enhanced resistance to chemical and biological surface contamination.

24 Claims, 5 Drawing Sheets

OTHER PUBLICATIONS

Shirk, et al., Lead Phthalocyanine Reverse Saturable Absorption Optical Limiters, Pure Appl. Opt. 5, 1996, pp. 701-707.

Bench, et al., Perfluoroalkyl Phthalocyanines, (Communications) Agnew. Chem. Int. Ed., 2002, vol. 41, No. 5.

Liao, et al., Effects of Peripheral Substituents and Axial Ligands on the Electronic Structure and Properties of Iron Phthalocyanine, Inorganic Chemistry, vol. 43, No. 22, 2004, pp. 7151-7161.

Keizer, et al., Spectroscopy and Electronic Structure of Electron Deficient Zinc Phthalocyanines, J. Am. Chem. Soc., 2003, vol. 125, pp. 7067-7085.

FUNCTIONAL COATING COMPOSITIONS OF PERFLUOROALKYL PERFLUORO-PHTHALOCYANINE COMPOUNDS

CROSS-REFERENCE TO RELATED APPLICATIONS

The present application claims the benefit of a co-pending, commonly assigned provisional patent application entitled "Functional Coating Compositions of Perfluoroalkyl Metallo Perfluoro-Phthalocyanine Compounds," which was filed on Feb. 8, 2005 and assigned Ser. No. 60/651,126. The contents of the foregoing provisional patent application are hereby incorporated by reference.

FIELD OF THE INVENTION

The present invention relates to the field of fluorinated coatings. It more particularly relates to organic/inorganic composites comprising perfluoroalkyl perfluoro-phthalocyanines, with or without a suitable, conductive polymer for use as functional coatings. More particularly, the present invention relates to perfluoroalkyl perfluoro-phthalocyanines for use as functional coatings imparting one or more of the following functionalities: chemical resistance, thermal resistance, biological and/or chemical non-stick surface effects, electrochromism, and non-linear optical properties.

BACKGROUND OF THE INVENTION

Redox processes occur whenever electrons enter or leave molecular frontier orbitals. Consequently, for a given molecule, the energy and intensity of absorption and emission of electromagnetic radiation, as well as its electrical and magnetic properties, vary when electrons are added or removed. The redox process is determined to a large extent by the type, number and arrangements of atoms, i.e., by the molecular structure. The kinetics of electron transfer, induced by an external source such as an electrode, while influenced by the particular molecular structure of a material, could be controlled by the rate of potential variation at the electrode. This principle is used, for example, in variable scan rate cyclic voltammetry, to add or remove electrons at rates that may exceed chemical transformations at the surface of electrodes.

Electrochromism refers to reversible changes in optical absorption induced by electron-transfer, changes that could occur in the ultraviolet, visible or infra-red spectral regions. Electrochromism results in both color and transparency changes. Simultaneous changes in electrical and magnetic properties may also occur. The changes could occur at time scales ranging from essentially infinite (static) for a one time switch to sub seconds (dynamic) for a modulated electron transfer range. Redox active molecules (transducers) are generally effective in supporting the noted modulated changes.

Figure 1:
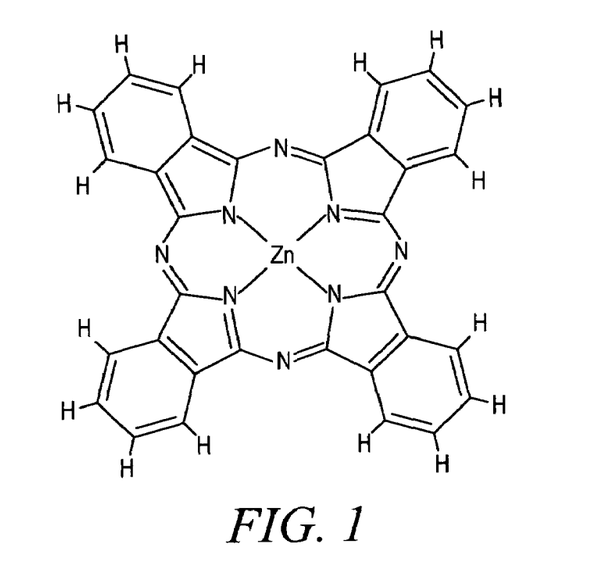
FIG. 1 is a representation of a metallo phthalocyanine (zinc phthalocyanine) molecule.

Phthalocyanines are highly conjugated macrocycles known in the art, and can be used as reversible electron acceptors. Phthalocyanines also undergo electrochromism. FIG. 1 is representative of a class of highly fluorinated phthalocyanine molecules exhibiting large molar extinction coefficients, ~$10^5$, in the UV-visible range, high thermal and chemical stability, and reversible redox properties. The organic moieties of these molecules are diamagnetic, but the introduction of metal ions with open electronic shells renders them paramagnetic. The addition or removal of electrons changes the magnetic state depending upon the type of metal and number of electrons. The electrical properties, such as conductivity, dielectric constants, etc., also vary.

Based on their unique electrochemical, optical, chemical, and electrical properties, phthalocyanines find a broad range of uses from medicine to fuel cells to advanced materials. Literature discussions addressing the properties of phthalocyanines include "*Phthalocyanines: Properties and Applications*" Vols. 1-4 (Eds.: C. C. Leznoff, A. B. P. Lever), VCH Publishers, New York, 1990-1996, and "*Phthalocyanine Materials: Synthesis, Structure and Function*" N. B. McKeown, Cambridge University Press, Cambridge, 1998. More particularly, phthalocyanines are used for their electrochemical properties in fuel cells and batteries, chemical properties in deodorants and catalysis, electrical properties in organic semiconductors and synthetic metals, and optical properties in pigments, optical disks, non-linear optics, high density memory, and photodynamic therapy of cancer. Moreover, phthalocyanines are used for their combined electrochemical and optical properties in electrochromic displays, combined optical and electrical properties in photocopier charge generators and solar cells, and combined chemical and electrical properties in chemical sensors.

Despite their favorable thermal and electronic properties, the presence of C—H bonds renders phthalocyanines chemically vulnerable. Another disadvantage of phthalocyanines is that they are sparingly soluble, which presents difficulties in processing in solution form. In particular, the poor solubility of phthalocyanines makes difficult coating of metal surfaces. Organic substituents or axial ligands that are equatorially coordinated by the macrocycle are known to enhance the compatibility of phthalocyanines with organic matrices, but at the expense of chemical stability.

Phthalocyanines can accommodate almost any metal ion at their center, thus providing opportunities for reversible electronic population of "d" and "f" orbitals. Regarding electronic properties, the orbital levels in general and the HOMO-LUMO gap in particular, are functions of both the nature of the metal center and organic moiety, thus offering prospects for rational color tuning. Fluorescence and luminescence are additional tunable optical properties, as well as the magnetic and electrical properties.

Phthalocyanines also exhibit nonlinearity of their optical properties. Phthalocyanines and their metal complexes exhibit favorable third-order nonlinear optical properties in the visible and near IR regions, which is of interest in civilian and military applications (optical limiters), as discussed in "Lead phthalocyanine reverse saturable absorption optical limiters," J. S Shirk et al., *Pure Appl. Opt.*, 5, 701,1996. Nonlinear absorption is the main mechanism near the limiting threshold. The spectral window over which the limiter operates can be engineered by altering both the main ring (non-peripheral) and peripheral substitution of the molecules.

From an electronic perspective, for each well-defined orbital level set, i.e., well defined energy levels of phthalocyanines, the number of electrons may be varied by the application of a variable potential using electrodes. The voltages required for electron transfer are quite low, and are generally below 5 V. Modern electronic devices are able to generate voltage sign reversals with very high frequency.

U.S. Pat. No. 6,511,971 to S. M. Gorun discloses substituted phthalocyanine compounds including perfluoroalkyl metallo perfluoro-phthalocyanine compounds and methods of synthesizing these compounds. Pharmaceutical compositions comprising substituted phthalocyanine compounds and methods of using these compounds, for example for treatment of cancer, are also disclosed. U.S. Pat. No. 6,511,971 is incorporated herein by reference in its entirety.

Additional literature references of background interest for purposes of the present disclosure include: "Introduction of Bulky Perfluoroalkyl Groups at the Periphery of Zinc Perfluoro Phthalocyanine: Chemical, Structural, Electronic, and Preliminary Photophysical and Biological Effects," B. A. Bench, A. Beveridge, W. M. Sharman, G. J. Diebold, J. E. van Lier, S. M. Gorun, *Angew. Chem. Int. Ed.*, 41, 748, 2002; "Effects of Peripheral Substituents and Axial Ligands on the Electronic Structure and Properties of Iron Phthalocyanine," M.-S. Liao, T. Kar, S. M. Gorun, S. Scheiner *Inorg. Chem.*, 43, 7151, 2004; "Spectroscopy and Electronic Structure of Electron Deficient Zinc Phthalocyanines," S. P. Keizer, W. J. Han, J. Mack, B. A. Bench, S. M. Gorun, M. J. Stillman, *J. Am. Chem. Soc.*, 125, 7067, 2003; "Synthesis and structural characterization of non-planar perfluoro phthalonitriles," S. M. Gorun, B. A. Bench, G. Carpenter, M. W. Beggs, J. T. Mague, H. E. Ensley, *J. Fluorine Chem.*, 91, 37, 1998; "Synthesis and Structure of a Bi-concave Perfluoro Cobalt Phthalocyanine and its Catalysis of Novel Oxidative Carbon-Phosphorus Bonds Formation using Air," B. A. Bench, W. W. Brennessel, H.-J. Lee, S. M. Gorun, *Angew. Chem. Int. Ed. Eng*, 41, 751, 2002; and "Dome-distortion and fluorine-lined channels: synthesis, and molecular and crystal structure of a metal- and C—H bonds-free fluorophthalocyanine," H. Lee, W. Brennessel, J. Lessing, W. Brucker, V. Young Jr., S. M. Gorun, *Chem. Commun.*, 1576, 2003.

Despite efforts and investigations to date, a need remains for phthalocyanines that offer enhanced properties and/or support desired applications. In addition, a need remains for coating compositions that offer one or more of the following enhanced properties to the coated substrate and/or coating system: chemical resistance, thermal resistance, biological and/or chemical non-stick surface effects, electrochromism, and non-linear optical properties. These and other needs are satisfied by the disclosed coating molecules, coating systems and coating applications.

SUMMARY OF THE INVENTION

According to the present disclosure, an advantageous coating composition comprising an aqueous or organic solvent and a perfluoroalkyl perfluoro-phthalocyanine compound of the following formula is provided:

wherein $R_f$ is a perfluoroalkyl group and M is a metallic or non-metallic constituent.

A further aspect of the present disclosure relates to an advantageous coating composition comprising an aqueous or organic solvent and a perfluoroalkyl perfluoro-phthalocyanine compound of the following formula:

wherein $R_f$ is a perfluoroalkyl group and M stands for one or two hydrogen atoms or a non-metallic constituent, such as silicon.

In a further aspect of the present disclosure, the coating composition comprising a perfluoroalkyl metallo or non-metallo perfluoro-phthalocyanine compound has an overall charge of zero.

In a further aspect of the present disclosure, the coating composition comprising a perfluoroalkyl metallo or non-metallo perfluoro-phthalocyanine compound has an overall charge that may vary from −4 to +4, depending upon the nature of M.

In a further aspect of the present disclosure, a coating composition comprising an aqueous or organic solvent, a perfluoroalkyl metallo or non-metallo perfluoro-phthalocyanine compound and one or more conductive polymers is provided.

In a further aspect of the present disclosure, a method for producing and applying a coating composition comprising a perfluoroalkyl metallo or non-metallo perfluoro-phthalocyanine compound of the type described herein is provided. In an exemplary embodiment, the disclosed method generally includes the steps of: 1) reacting a commercially available perfluorophthalonitrile with a perfluoroalkene in the presence of an inorganic fluoride to yield a perfluoroalkyl perfluorophthalonitrile, 2) purifying the perfluoroalkyl perfluorophthalonitrile, for example via chromatography, 3) reacting the purified perfluoroalkyl perfluorophthalonitrile with a metal or non-metallic source to yield a perfluoroalkyl metallo or non-metallo perfluoro-phthalocyanine compound, 4) dissolving the perfluoroalkyl metallo perfluoro-phthalocyanine compound in an aqueous or organic solvent to form a perfluoroalkyl metallo or non-metallo perfluoro-phthalocyanine coating composition, and 5) applying the coating composition to a substrate or surface.

In a further aspect of the present disclosure, the disclosed method for producing and applying a coating composition comprising a perfluoroalkyl metallo or non-metallo perfluoro-phthalocyanine compound further includes the addition of one or more conductive polymers to the disclosed coating composition and/or coating system.

Numerous advantages result from the advantageous coating compositions, coating systems and coating applications comprising phthalocyanine compounds disclosed herein and the uses/applications therefore.

For example, in exemplary embodiments of the present disclosure, the disclosed coating compositions, coating systems and coating applications comprising perfluoroalkyl metallo or non-metallo perfluoro-phthalocyanines advantageously exhibit hydrophobic properties at their periphery, e.g., when applied to a substrate.

In a further exemplary embodiment of the present disclosure, the disclosed coating compositions, coating systems and coating applications comprising perfluoroalkyl metallo or non-metallo perfluoro-phthalocyanines exhibit enhanced Lewis acidity and/or hydrophilicity at the metal or non-metallic center.

A further advantage associated with exemplary embodiments of the disclosed coating compositions, coating systems and coating applications comprising perfluoroalkyl metallo and non-metallo perfluoro-phthalocyanines relates to the presence of an uninterrupted (or substantially uninterrupted) fluorinated surface for such compounds.

A further advantage found with exemplary embodiments of the present disclosure is that the disclosed coating compositions, coating systems and coating applications comprising perfluoroalkyl metallo or non-metallo perfluoro-phthalocyanines that are characterized, in whole or in part, by an uninterrupted (or substantially uninterrupted) fluorinated surface advantageously exhibit improved durability, functionality, and/or a decreased propensity for surface contamination.

In a further exemplary embodiment of the present disclosure, the coating compositions, coating systems and coating applications comprising perfluoroalkyl metallo or non-metallo perfluoro-phthalocyanines disclosed herein exhibit variable rates of reversible electronic transfer.

A further advantage of the present disclosure is that exemplary embodiments of the disclosed coating compositions, coating systems and coating applications comprising perfluoroalkyl metallo or non-metallo perfluoro-phthalocyanines exhibit an extended range of redox and/or optical properties.

An additional advantage of the present disclosure is that exemplary embodiments of the disclosed coating compositions, coating systems and coating applications comprising perfluoroalkyl metallo or non-metallo perfluoro-phthalocyanines that are characterized by relatively longer and bulkier perfluoroalkyl groups exhibit favorable solubility and/or blending properties while maintaining desirable redox capabilities.

A still further advantage associated with exemplary embodiments of the present disclosure is that the disclosed coating compositions comprising perfluoroalkyl metallo or non-metallo perfluoro-phthalocyanines are suitable for use as functional coating(s) and that such functional coating(s) advantageously exhibit one or more of the following properties: variable optical, electric and/or magnetic properties, enhanced durability, and/or enhanced resistance to chemical and/or biological surface contamination.

The disclosed coating compositions, coating systems and coating applications comprising perfluoroalkyl metallo or non-metallo perfluoro-phthalocyanines have numerous applications, either alone or in combination with other materials, compounds and/or systems. For example, the disclosed coating compositions, coating systems and coating applications comprising perfluoroalkyl metallo or non-metallo perfluoro-phthalocyanines may be incorporated and/or combined with a redox system to yield variations of optical, electrical and/or magnetic signatures of the phtalocyanine.

These and other advantages, features and attributes of the coating compositions, coating systems and coating applications comprising perfluoroalkyl metallo and non-metallo perfluoro-phthalocyanines of the present disclosure and their advantageous applications and/or uses will be apparent from the detailed description which follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DETAILED DESCRIPTION OF THE INVENTION

The perfluoroalkyl metallo and non-metallo perfluoro-phthalocyanine compounds of the present disclosure offer significant advantages in a broad range of coating applications. The advantageous properties and/or characteristics of the disclosed phthalocyanines are based, at least in part, on the chemical structure of the disclosed phthalocyanines, which include, inter alia, an inert, covalently bonded fluorinated surface. The disclosed phthalocyanines exhibit improved and/or advantageous properties that are beneficial in a variety of coating applications, e.g., improved durability, functionality (variable optical, electric and magnetic properties), and/or a decreased propensity for biological and/or chemical surface contamination. Perfluoroalkyl metallo and non-metallo perfluoro-phthalocyanine compounds, with or without a suitable conductive polymer, are also advantageous in being particularly suitable for use as functional coatings. In addition, covalently bonding a fluoropolymer to a metallo or non-metallo phthalocyanine to yield an electro, magneto and optical transducer within an inert matrix offers advantageous coating-related properties and/or coating applications. Indeed, the use of such organic/inorganic composite transducers as inert—yet functional—coatings represents a beneficial advance relative to teachings in the prior art.

Figure 2:
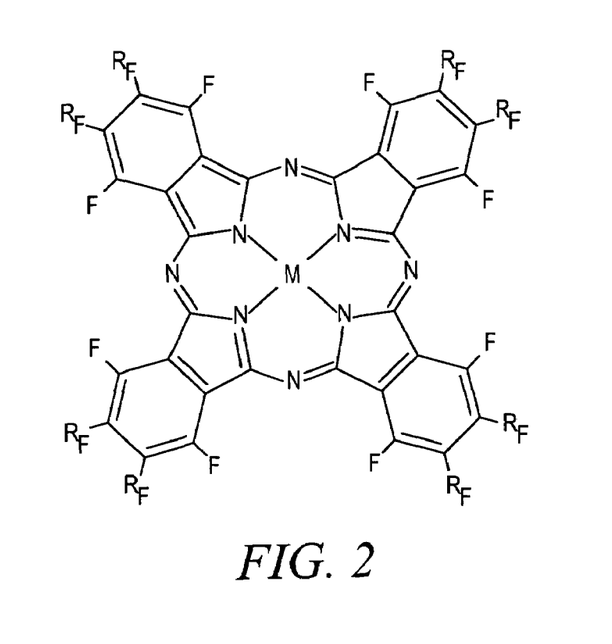
FIG. 2 is a representation of a perfluoroalkyl metallo perfluoro-phthalocyanine molecule wherein M is a metal or non-metallic constituent and $R_f$ is a perfluoroalkyl group.

According to exemplary embodiments of the present disclosure, synthesis of metallo and non-metallo perfluoro-phthalocyanines with perfluoroalkyl groups attached to the periphery of the molecule as disclosed herein advantageously provides fluorinated materials/compounds around redox active metal or non-metallic centers that have properties similar and/or comparable to Teflon™ products (DuPont, Wilmington, Del.). FIG. 2 represents an exemplary perfluoroalkyl metallo or non-metallo perfluoro-phthalocyanine molecule of the present disclosure where M is a metal or non-metallic constituent, and $R_f$ is a perfluoroalkyl group.

Metal ions that may be used in the disclosed perfluoroalkyl metallo perfluoro-phthalocyanine compounds include, but are not limited to, species containing or including "d" (transition metals) and "f" (lanthanide/rare earth series) electrons. The elements in the three long periods of the periodic table, Groups IIIB through IIB, are termed the transition metals. The transition metals have partially filled "d" orbitals and, in some cases, one or two electrons in the next higher level energy shell. The lanthanide/rare earth series metals have partially filled "f" orbitals. Two exemplary transition metals for use according to the present disclosure are cobalt and iron.

Furthermore and with further reference to FIG. 2, the metal ion, M, may be substituted by other non-metallic atoms including, but not limited to, one or two hydrogen atoms, and silicon, without departing from the spirit or scope of the present disclosure. In particular, when "M" is substituted by $H_2$, the resulting perfluorinated metal-free phthalocyanine compound also exhibits dome-like molecular distortion and structural deformation in the solid state that is typically induced by large metal ions. In this regard, reference is made to the publication entitled "Dome-distortion and fluorine-lined channels: synthesis, and molecular and crystal structure of a metal- and C—H bonds-free fluorophthalocyanine," H. Lee, W. Brennessel, J. Lessing, W. Brucker, V. Young Jr., S.M. Gorun, *Chem. Commun.*, 1576, 2003.

Perfluoroalkyl metallo and non-metallo perfluoro-phthalocyanine compounds for use in advantageous coating applications according to the present disclosure have an overall charge that may vary from −4 to +4, depending upon the nature of M. When the charge is different from zero, it is understood that counter ions are present in the system as a whole. For example, if the perfluoroalkyl metallo or non-metallo perfluoro-phthalocyanine molecule has a charge of +1, cations including, but not limited to nitrate, sulphate, and alkanoate, may be employed to compensate for the positive charge. The present disclosure is not limited to this exemplary charge-balanced system, but encompasses a broad range of charge-balanced system wherein the perfluoroalkyl metallo or non-metallo perfluoro-phthalocyanine compound exhibits a charge of +4 to −4, and one or more additional constituents function to balance such phthalocyanine charge, as will be apparent to persons skilled in the art based on the present disclosure.

In exemplary embodiments of the present disclosure, the phthalocyanine coating compositions may be characterized by the formula $[F_{64}PcM(S_z)_n(S_{z'})_m(S_{z''})_p]$, wherein M is a metal or non-metal constituent; $S_z$ is a first axial ligand located or positioned with respect to the metal/non-metallic constituent, $S_{z'}$ is a second axial ligand located or positioned with respect to the metal/non-metallic constituent, and $S_{z''}$ is a third axial ligand located or positioned with respect to the metal/non-metallic constituent, and wherein n, m and p are integers selected from 0, 1, 2 and 3, and wherein n+m+p is an integer between 0 and 4 (inclusive). Disclosed ligands, i.e., first, second and third ligands $S_z$, $S_{z'}$ and $S_{z''}$, respectively, may be the same or different molecules/compounds.

While the structural formulae for advantageous perfluoroalkyl metallo and non-metallo perfluoro-phthalocyanines of the present disclosure may take the general form $[F_{64}PcM(S_z)_n(S_{z'})_m(S_{z''})_p]$, it is noted that one or more of the ligands ($S_z$, $S_{z'}$, $S_{z''}$) may exhibit a charge, e.g., the ligand may be an anion or cation. As will be readily apparent to persons skilled in the art, the overall charge of the disclosed perfluoroalkyl metallo or non-metallo perfluoro-phthalocyanine as part of a coating system is balanced, i.e., charge neutral. Charge balance/neutrality may be achieved for the disclosed perfluoroalkyl metallo or non-metallo perfluoro-phthalocyanines through charge contributions from the metal (or non-metallic) constituent (M), the ligand(s) and/or association/bonding with one or more additional constituents, e.g., one or more charged species (X).

In exemplary embodiments of the present disclosure, a positive charge associated with the metal (or non-metallic) constituent may be balanced by one or more ligands ($S_z$, $S_{z'}$, $S_{z''}$) and/or additional charged species (X). In the case of perfluoroalkyl metallo or non-metallo perfluoro-phthalocyanines that include charged species (X), the perfluoroalkyl metallo or non-metallo perfluoro-phthalocyanine may take the form $[F_{64}PcM(S_z)_n(S_{z'})_m(S_{z''})_p](X)_q$, wherein X is a charged species or multiple charged species (e.g., halogen(s)), and wherein the integers n, m, p and q provide charge balance or neutrality to the disclosed perfluoroalkyl metallo or non-metallo perfluoro-phthalocyanine. It is to be understood that one or more additional constituents (e.g., charged species) may be associated with the disclosed perfluoroalkyl metallo or non-metallo perfluoro-phthalocyanine to achieve or provide charge balance, and such additional constituent(s)—as appropriate—are expressly incorporated into the various coating compositions, coating systems and coating applications described herein.

It is noted that, according to exemplary embodiments of the present disclosure, at least one S-type ligand, i.e., $S_z$, $S_{z'}$, or $S_{z''}$, is at least bifunctional. This means that the ligand has the minimum general formula Y-L-W, where Y and W are functional groups capable of binding to metal centers and/or metal/substrate surfaces, while L stands for linking atom(s) or molecules. Y and W could be neutral or charged. Typical examples of Y and W constituents and associate functionalities include:

Bronsted-Lowry acid residues (organic or inorganic), for example —COOH, —SO₃H (and deprotonated forms);
Bronsted-Lowry basic residues (organic or inorganic), for example —OH, SH, —NH₃, —NH₂, —NH (and protonated forms); and
neutral groups: O, S, N (for example bypyridine), halogens and like groups that exhibit Lewis acidity or Lewis basicity.

With further reference to the general formula Y-L-W referenced above, L can be any group or groups of atoms or molecules to which the Y and W functional groups functionally attach. Additional functional groups could be present/included without hindering the critical property of the Y-L-W ligand to provide a link between a surface/substrate and a phthalocyanine coating composition, coating system or coating application.

It is also noted that the Y-L-W type S ligand(s) may comprise functionalities that exhibit useful electronic, structural and/or other physical properties that function to enhance, in whole or in part, the properties exhibited by the phthalocyanine coating composition. For example, if the Y-L-W ligand is effective in mediating electronic transfer via orbital overlap, an electronic connection is established between the phthalocyanine composition and the surface/substrate it covers, as well as between adjacent layers of phthalocyanines. As a result, extended molecular orbitals could be established, resulting in useful binding (sensorial), optical, photophysical, conductive (electrochemical) and magnetic properties in the coated system.

Examples of the electronic influence of S ligands upon the optical, electronic and magnetic properties of phthalocyanines are presented in: "Effects of Peripheral Substituents and Axial Ligands on the Electronic Structure and Properties of Iron Phthalocyanine," M. S. Liao, T. Kar, S. M. Gorun, S. Scheiner, *Inorg. Chem.*, 43, 7151, 2004; "Effects of Peripheral Substituents on the Electronic Structure and Properties of Unligated and Ligated Metal Phthalocyanines, Metal=Fe, Co, Zn;" M. S. Liao, J. D. Watts, M.-J, Huang, S. M. Gorun, T. Kar, S. Scheiner, *J. Chem. Theory Comput.*, 1, 1201, 2005.

The perfluoroalkyl groups, $R_f$, that may be advantageously incorporated in the disclosed perfluoroalkyl metallo and non-metallo perfluoro-phthalocyanine compounds include, but are not limited to, perfluoroisopropyl, perfluorohexyl, perfluorooctyl, and combinations thereof Moreover, the aforementioned perfluoroalkyl groups may contain additional groups, for example, but not limited to fluorinated aromatic molecules. Perfluoroalkyl groups comprising 3 and 6 carbon atoms are particularly effective for covalently bonding to the periphery of metallo and non-metallo perfluoro-phthalocyanines according to the present disclosure. An exemplary perfluoroalkyl group with 3 carbon atoms is perfluoroisopropyl.

Figure 3:
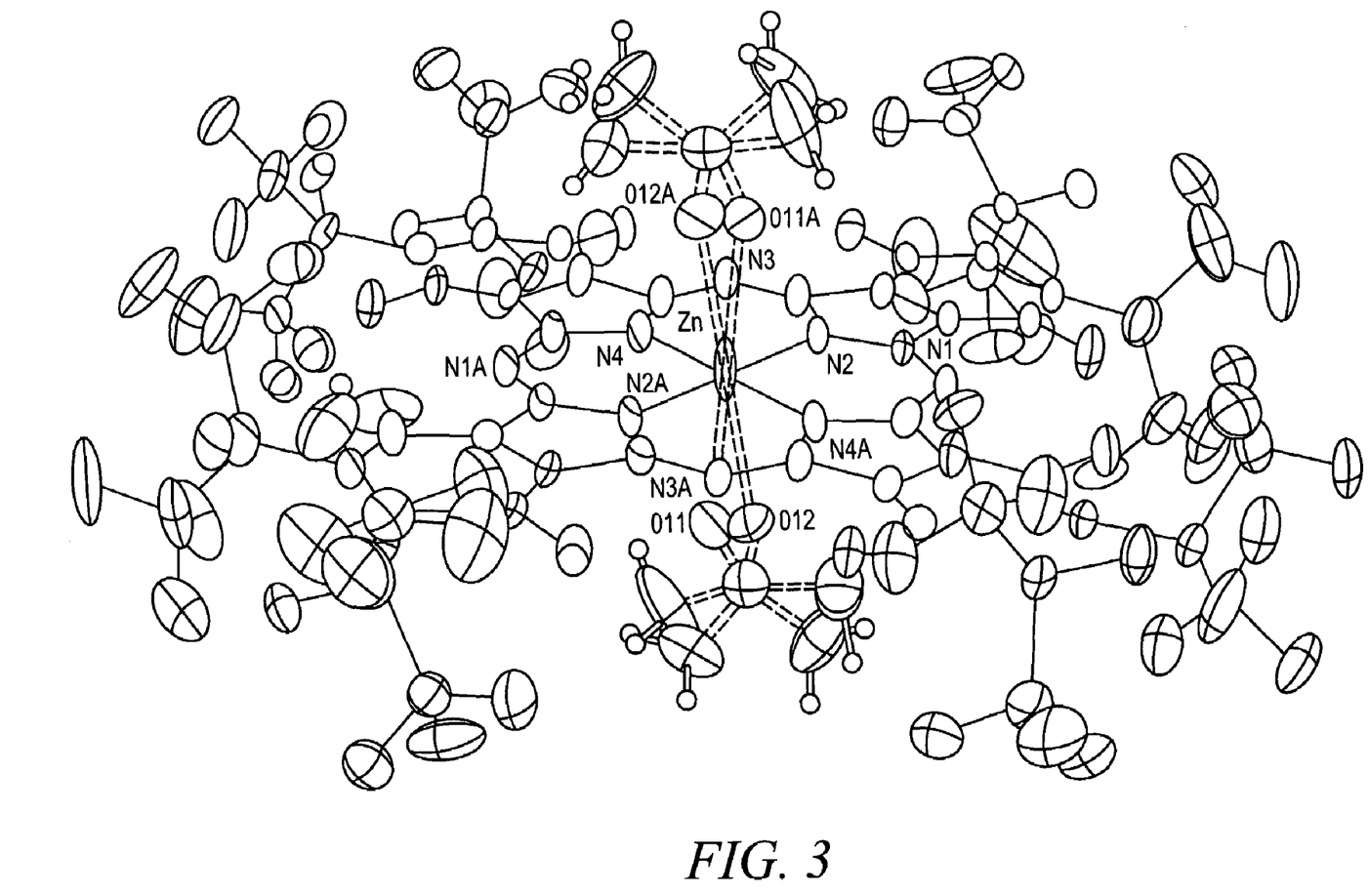
FIG. 3 depicts the X-ray structure shown as van der Waals representation of perfluoro zinc phthalocyanine showing the superhydrophobic peripheral fluorine region and a metal-bonded acetone molecule in the central, hydrophilic region via its oxygen.

FIG. 3 depicts an X-ray structure reflecting a van der Waals representation of perfluoro Zn phthalocyanine. The X-ray structure of FIG. 3 shows a superhydrophobic peripheral fluorine region and a metal-bonded acetone molecule in the central, hydrophilic region (via its oxygen). The molecular structure of FIG. 3 is expected to exhibit advantageous hydrophobic properties at its periphery, thus facilitating blending with organic (including fluoro-organic) polymers and/or constituents.

Figure 4:
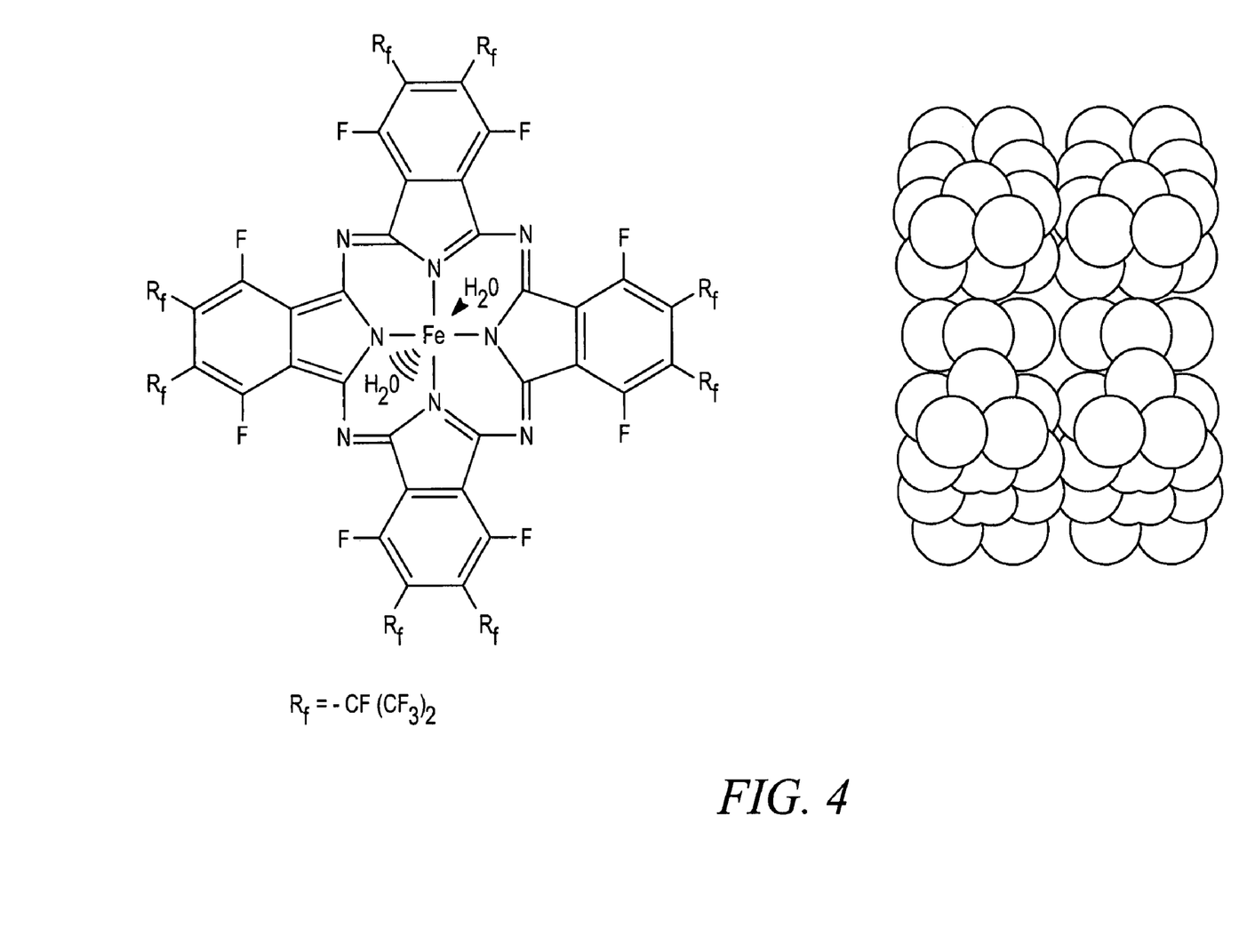
FIG. 4 depicts aggregation via axial hydrogen bonded water molecules. The central metal represented by a sphere is iron.

FIG. 4 depicts aggregation via axial hydrogen bonded $H_2O$ molecules. In the exemplary depiction of FIG. 4, the central metal (represented by a sphere) is iron. The metal center, whose Lewis acidity is expected to be enhanced by the fluorinated substituents, provides a strongly hydrophilic center for nanoscale aggregations and/or an anchor point for one or more attachments to metal surfaces. In the exemplary depiction of FIG. 4, the iron centers are coordinated by hydrophilic water.

Real iron surfaces (as opposed to clean ones) similarly exhibit hydrophilicity due to generally unavoidable surface oxygen containing groups such as oxide, hydroxide or mixed oxide-hydroxide. Capping the metal centers of a coated layer with an organic molecule that binds metal(s) via a polar group (e.g., the carboxylic moiety of a perfluoro carboxylic acid), while being terminated by a non-polar group (e.g., a perfluoro methyl moiety of a perfluoro carboxylic acid), results in a continuous and uninterrupted fluorinated surface according to the present disclosure. Such a non-stick, fluorinated surface will retain functionality and durability with a decreased propensity for surface contamination and, in particular, chemical and/or biological surface contamination. These physical properties are advantageous in a variety of applications.

Figure 5:
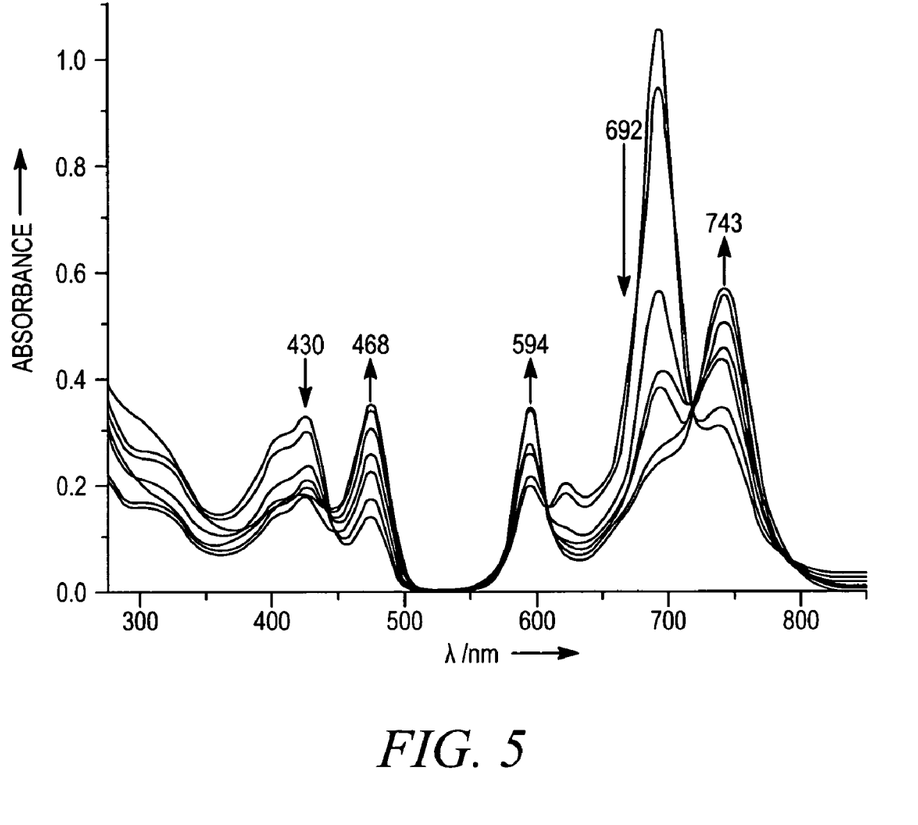
FIG. 5 depicts changes in the optical spectrum of perfluoro zinc phthalocyanine upon addition of electrons.

The determination of the range of variable rates of reversible electronic transfer is of general importance with respect to optical and redox properties of perfluoroalkyl metallo and non-metallo perfluoro phthalocyanines. In the case of perfluoroalkyl metallo perfluoro phthalocyanine where M=Zn and $R_f$=perfluoro isopropyl (FIG. 5), observation of the optical and redox properties suggests that the perfluoroalkyl substituents are compatible with electron transfer. FIG. 5 represents changes in the optical spectrum of perfluoro zinc phthalocyanine [$F_{64}$PcZn] upon addition of electrons. In this case, the metal center ($Zn^{2+}$) is not redox active, and thus the organic moiety, subject to synthetic modifications, acts as a reversible electron reservoir. According to exemplary embodiments of the present disclosure, introduction of a redox active metal may extend the range of redox and optical properties, while the introduction of longer and bulkier $R_f$ groups may impart favorable solubility and blending properties, while maintaining the redox capabilities. The disclosed perfluoroalkyl metallo and non-metallo perfluoro-phthalocyanines generally exhibit variable rates of reversible electronic transfer.

The perfluoroalkyl metallo and non-metallo perfluoro-phthalocyanines disclosed herein may be used as functional coatings with or without the use of conductive polymers to form novel organic/inorganic coating compositions. The perfluoroalkyl metallo and non-metallo perfluoro-phthalocyanines disclosed herein may be dissolved in a suitable acqueous or organic solvent to form a coating composition. The conductive polymers used in the disclosed functional coatings may be, but are not limited to, classical polyparaphenylene, polyaniline, polypyrrole, polythiophene, as well as polymers obtained from using bridging axial ligands to give structures of the type presented in FIG. 4. Bridging axial ligands generally contain either a single or several atoms or anions capable of forming chemical bonds (bridges) with two metals, or molecules with two functional groups, each capable of coordinating a metal. Bridges including anions may be, but are not limited to, halogens, cyanide, oxide, sulfide, selenide, carbide, sulfate, nitrate, phosphate, and combinations thereof Bridges including difunctional groups capable of coordinating a metal may be, but are not limited to, dialcohols, dicarboxylic acids, diketones, diesters and their thio analogues, aliphatic or aromatic diamines, and combinations thereof. In cases where the charges of the constituents permit, bridging groups may also be cationic.

Functional coatings that are based, in whole or in part, on the disclosed perfluoroalkyl metallo and non-metallo perfluoro-phthalocyanines of the present disclosure generally exhibit advantageous functional properties, e.g., including one or more of the following enhanced physical properties/characteristics: enhanced chemical resistance, enhanced thermal resistance, biological and/or chemical non-stick surface behavior, electrochromism (ranges from the ultraviolet to the infra-red spectral regions), variable electromagnetic field signatures and/or non-linear optical properties (optical limiters). Moreover, the use of a variable electric potential generated by external electrodes may be used to vary the above functionalities on timescales below one change per second to produce an inert, coating functionalized to exhibit variable optical, electric and/or magnetic properties, while still maintaining durability and preventing (and/or inhibiting) chemical and biological surface contamination.

Since both the center (metallic or non-metallic) and the organic matrix of the disclosed perfluoroalkyl metallo/non-metallo perfluoro-phthalocyanine compounds may be varied independently, the combination of these two degrees of freedom results in hundreds (or even more) molecules whose distinct physical properties and characteristics will span a range of values of beneficial value in coating applications of the type disclosed herein. An example is a change in color or electrical conductivity triggered by the replacement of one metal ion by another within a given organic matrix.

The perfluoroalkyl metallo and non-metallo perfluoro-phthalocyanine functional coatings disclosed herein may be used in a wide variety of applications, that include, but are not limited to, corrosion prevention/reduction and/or producing non-stick (or substantially non-stick) surfaces.

Figure 6:
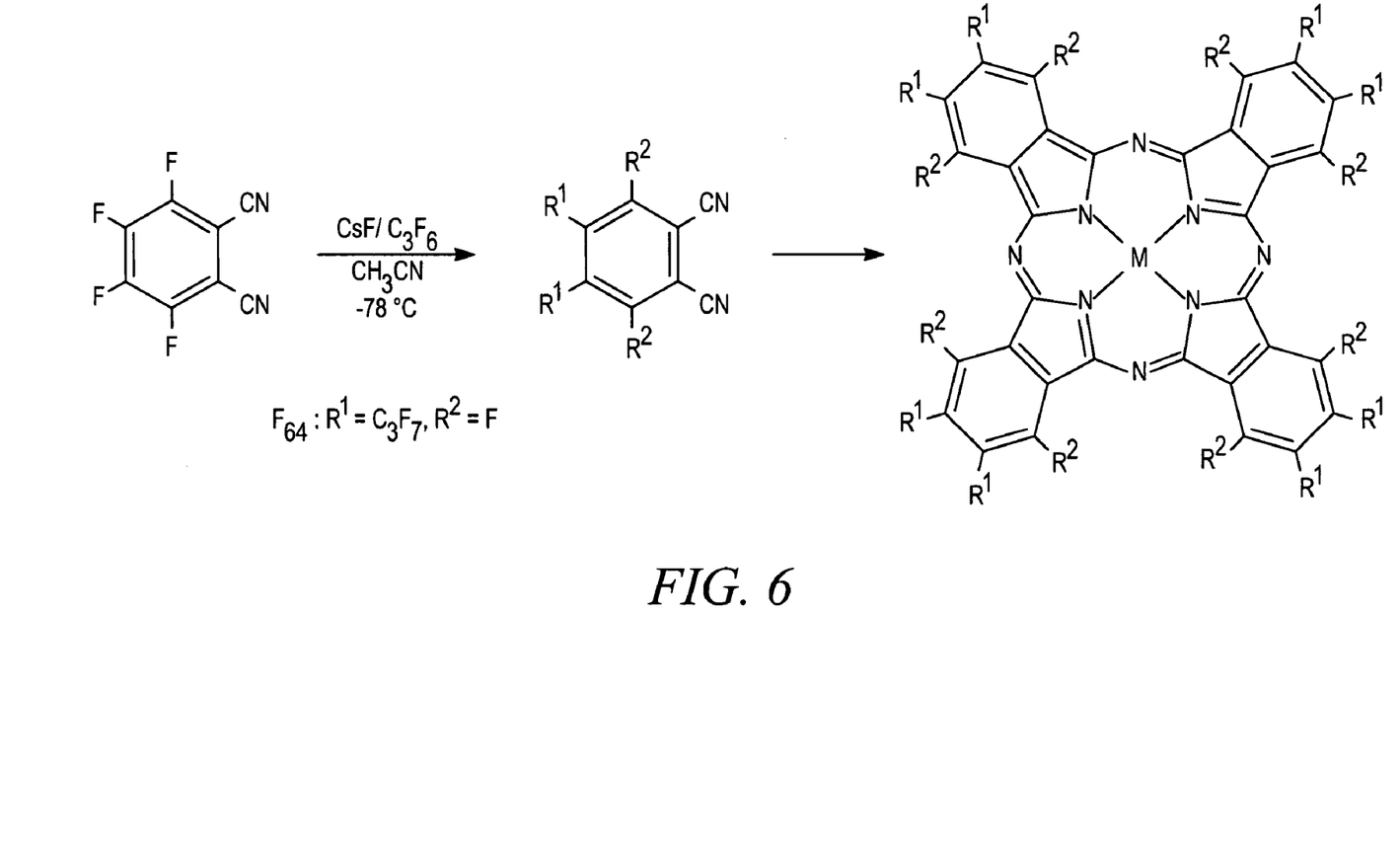
FIG. 6 depicts a representative synthesis process for producing perfluoroalkyl metallo perfluoro-phthalocyanine compounds.

FIG. 6 is a representative synthesis process for producing perfluoroalkyl metallo or non-metallo perfluoro-phthalocyanine compounds. The method of forming a perfluoroalkyl metallo or non-metallo perfluoro-phthalocyanine coating compositions comprises the steps of 1) reacting a commercially available perfluorophthalonitrile with a perfluoroalkene in the presence of an inorganic fluoride to yield a perfluoroalkyl perfluorophthalonitrile, 2) purifying the perfluoroalkyl perfluorophthalonitrile via chromatography, 3) reacting the purified perfluoroalkyl perfluorophthalonitrile with a metal or non-metal source (acts as a template) to yield a perfluoroalkyl metallo or non-metallo perfluoro-phthalocyanine, and 4) dissolving the perfluoroalkyl metallo or non-metallo perfluoro-phthalocyanine compound in an aqueous or organic solvent to form a perfluoroalkyl metallo or non-metallo perfluoro-phthalocyanine coating composition. Further details regarding the synthesis of perfluoroalkyl metallo perfluoro-phthalocyanines are disclosed in the following publications: "Introduction of Bulky Perfluoroalkyl Groups at the Periphery of Zinc Perfluoro Phthalocyanine: Chemical, Structural, Electronic, and Preliminary Photophysical and Biological Effects," B. A. Bench, A. Beveridge, W. M. Sharman, G. J. Diebold, J. E. van Lier, S. M. Gorun, *Angew. Chem. Int. Ed.*, 41, 748, 2002; "Synthesis and structural characterization of non-planar perfluoro phthalonitriles," S. M. Gorun, B. A. Bench, G. Carpenter, M. W. Beggs, J. T. Mague, H. E. Ensley, *J Fluorine Chem.*, 91, 37, 1998; and "Synthesis and Structure of a Bi-concave Perfluoro Cobalt Phthalocyanine and its Catalysis of Novel Oxidative Carbon-Phosphorus Bonds Formation using Air," B. A. Bench, W. W. Brennessel, H.-J. Lee, S. M. Gorun, *Angew. Chem. Int. Ed. Eng.*, 41, 751, 2002.

The coating compositions disclosed herein may be applied to a desired surface/substrate in a variety of ways. For example, the disclosed coating compositions may be applied through spray and other surface deposition techniques, electro deposition techniques, flame and plasma spraying techniques, physical vapour deposition techniques; chemical vapour deposition techniques, paint/brush and other surface application techniques. The concentration and overall amount of phthalocyanine coating composition applied to a surface/substrate will vary from application-to-application based, for example, on the characteristics/properties of the surface/substrate, the characteristics/properties of the specific phthalocyanine coating composition/system to be employed, and the desired physical and functional effects of the coating process/application.

Applicant has attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

I claim:
1. A coated substrate comprising:
   a. a perfluoroalkyl metallo or non-metallo perfluoro-phthalocyanine compound of the following formula:

b. wherein $R_f$ is a perfluoroalkyl group and M is a metal or non-metal constituent;
   c. a solvent within which the perfluoroalkyl metallo perfluoro-phthalocyanine compound is at least partially dissolved to define a coating system; and
   d. a substrate defining a surface to which the coating system is applied.

2. The coated substrate of claim 1, wherein M is a metal ion and said metal ion is selected from the group consisting of transition series metals.

3. The coated substrate of claim 2, wherein said metal ion is zinc, cobalt or iron.

4. The coated substrate of claim 2, wherein said metal ion is selected from the group consisting of lanthanide/rare earth series metals.

5. The coated substrate of claim 1, wherein said perfluoroalkyl group is selected from the group consisting of perfluoroisopropyl, perfluorohexyl, perfluorooctyl, and combinations thereof.

6. The coated substrate of claim 5, wherein said perfluoroalkyl group further comprises a fluorinated aromatic molecule.

7. The coated substrate of claim 1, wherein application of said coating system to said substrate imparts at least one of the following properties to said coated substrate: variable optical properties, variable electric properties, variable magnetic properties, enhanced durability, enhanced resistance to chemical contamination, enhanced resistance to biological surface contamination and a combination thereof.

8. The coated substrate of claim 1, wherein said coating system further comprises at least one conductive polymer.

9. The coated substrate of claim 8, wherein said at least one conductive polymer is selected from the group consisting of polyparaphenylene, polyaniline, polypyrrole, polythiophene, polymers derived from using bridging axial ligands, and combinations thereof.

10. The coated substrate of claim 9, wherein said polymers derived from using bridging axial ligands comprise one or more anions capable of forming chemical bonds with two metals or molecules with two functional groups capable of coordinating a metal,
  wherein said one or more anions capable of forming chemical bonds with two metals is selected from the group consisting of halogens, cyanide, oxide, sulfide, selenide, carbide, sulfate, nitrate, phosphate, and combinations thereof, and
  wherein said molecules with two functional groups capable of coordinating a metal is selected from the group consisting of dialcohols, dicarboxylic acids, diketones, diesters and their thio analogues, aliphatic or aromatic diamines, and combinations thereof.

11. The coated substrate of claim 1, wherein M is a non-metal constituent.

12. The coated substrate of claim 11, wherein the non-metal constituent is selected from hydrogen and silicon.

13. The coated substrate of claim 1, wherein said perfluoroalkyl metallo perfluoro-phthalocyanine compound has a charge in the range of +4 to −4, inclusive.

14. The coated substrate of claim 1, wherein the perfluoroalkyl metallo perfluoro-phthalocyanine compound is of the formula $[F_{64}PcM(S_z)_n(S_{z'})_m(S_{z''})_p]$, wherein M is a metal or non-metal constituent; $S_z$ is a first axial ligand located or positioned with respect to the metal/non-metallic constituent, $S_{z'}$ is a second axial ligand located or positioned with respect to the metal/non-metallic constituent, and $S_{z''}$ is a third axial ligand located or positioned with respect to the metal/non-metallic constituent, and wherein n, m and p are integers selected from 0, 1, 2 and 3, and wherein n+m+p is an integer between 0 and 4 (inclusive).

15. The coated substrate of claim 14, wherein the first, second and third ligands ($S_z$, $S_{z'}$ and $S_{z''}$, respectively) are the same molecule or compound.

16. The coated substrate of claim 14, wherein at least one of the first, second and third ligands ($S_z$, $S_{z'}$ and $S_{z''}$) exhibits a charge.

17. The coated substrate of claim 14, wherein the perfluoroalkyl metallo perfluoro-phthalocyanine compound is of the formula $[F_{64}PcM(S_z)_n(S_{z'})_m(S_{z''})_p](X)_q$, wherein X is one or more charged species, and wherein the integers n, m, p and q provide charge balance.

18. The coated substrate of claim 14, wherein at least one S ligand is at least bifunctional.

19. The coated substrate of claim 18, wherein the at least one bifunctional S ligand has the general formula Y-L-W, where Y and W are functional groups capable of binding to a metal center or metal substrate, and where L stands is one or more linking atoms or molecules.

20. The coated substrate of claim 19, wherein at least one of the Y and W functional groups is selected from the group consisting of a Bronsted-Lowry acid residue, a Bronsted Lowry basic residue and a neutral group that exhibits Lewis acidity or Lewis basicity.

21. A method of producing a coated substrate comprising the steps of:
  a. providing a coating composition that includes a perfluoroalkyl metallo or non-metallo perfluoro-phthalocyanine compound of the following formula:

wherein $R_f$ is a perfluoroalkyl group and M is a metal or non-metal constituent; and
  b. applying the coating composition to a surface of a substrate to form a coated substrate.

22. The method of claim 21, wherein said perfluoroalkyl metallo or non-metallo perfluoro-phthalocyanine-containing coating composition is effective to provide at least one of the following properties to the coated substrate: variable optical properties, variable electric properties, variable magnetic properties; enhanced durability; enhanced resistance to chemical surface contamination, enhanced resistance to biological surface contamination, and combinations thereof.

23. The method of claim 21, further comprising a step of adding a conductive polymer to said perfluoroalkyl metallo or non-metallo perfluoro-phthalocyanine-containing coating composition.

24. The method of claim 23, wherein said conductive polymer is selected from the group consisting of polyparaphenylene, polyaniline, polypyrrole, polythiophene, polymers derived from using bridging axial ligands, and combinations thereof.

* * * * *